May 6, 1924.

E. G. BARKER

ICE CREAM SERVER

Filed June 20, 1923

1,493,421

Inventor
E. G. Barker

Patented May 6, 1924.

1,493,421

UNITED STATES PATENT OFFICE.

EDMUND G. BARKER, OF MELBOURNE, VICTORIA, AUSTRALIA.

ICE-CREAM SERVER.

Application filed June 20, 1923. Serial No. 646,623.

*To all whom it may concern:*

Be it known that I, EDMUND GEORGE BARKER, a subject of the King of Great Britain and Ireland, and a resident of the city of Melbourne, in the county of Bourke, State of Victoria, Commonwealth of Australia, (whose post-office address is 63 Little Latrobe Street, in the said city of Melbourne), have invented a certain new and useful Improved Ice-Cream Server, of which the following is a specification.

This invention relates to paper or like cups or containers in which ice cream may be served.

It has hitherto been proposed to employ for the above purpose a cup or container of suitable paper such as that usually referred to as oil paper, having a serrated or corrugated wall to reinforce the structure, such cups or containers however are objectionable owing to the inconvenience experienced in handling them and the liability of the wall of the cup collapsing when it is moistened or softened by the ice cream therein.

The object of the present invention is to provide a simple and inexpensive holder or server for such cups whereby the cups may be more easily and conveniently handled the fingers being protected from the ice cream and the wall of the cup effectively reinforced so that it will not collapse in use when charged with ice cream.

Referring to the drawings which form part of this specification:—

Figure 2 is a perspective view showing the invention applied to a cup or container of the kind referred to.

The invention consists of a flat ring 2 of paper or other suitable material. Preferably the ring is of paper which may be relatively thin provided it has sufficient rigidity to maintain its flat contour.

Figure 1:
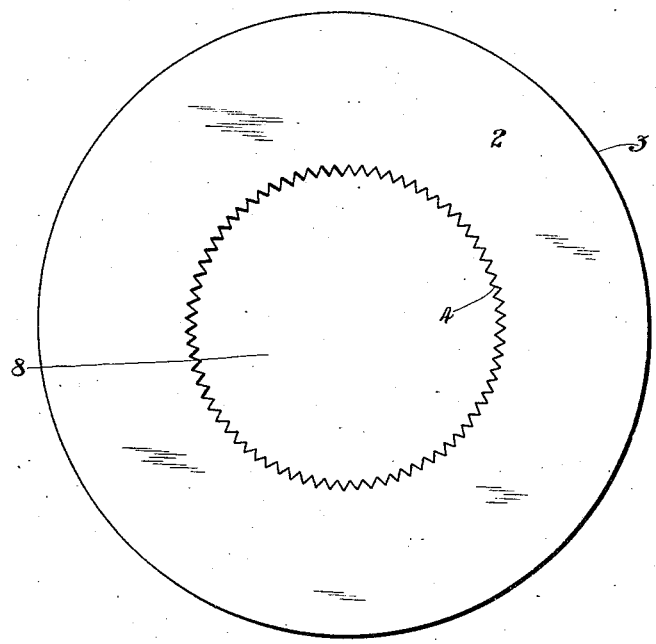
Figure 1 is a plan of the invention.
Figure 2:
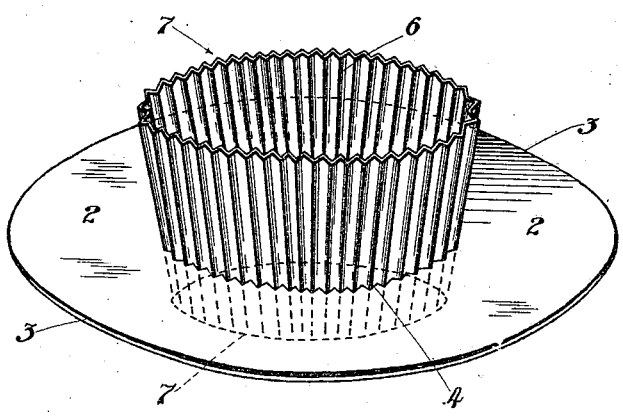

The outer edge 3 of such ring is preferably plain but its inner edge is serrated as at 4 the serrations being preferably V-shaped and adapted to accommodate the corresponding serrations or corrugations 6 in the wall of the paper or like cup 7 as seen in Figure 2.

In use the cup 7 is placed within the central opening 8 of the ring 2 so that the projecting parts of the serrations 6 are accommodated in the corresponding grooves or depressions of the serrations 4 as in Figure 2. The cup may be then filled with the ice cream and conveniently served by handling only the ring 2 which thus protects the fingers from the moist and sticky material and effectively supports the wall of the cup.

Having now described my invention what I claim as new and desire to secure by Letters Patent is:—

1. A plate-like element formed with an opening having a serrated wall, in combination with a container adapted to fit within said opening, the wall of the container being serrated to engage the serrations of the wall of the opening.

2. A plate-like element formed with an opening having a serrated wall, in combination with a container adapted to fit within said opening, the wall of the container being serrated to engage the serrations of the wall of the opening, said container being of slightly conical form with the minimum diameter slightly less than the diameter of the opening in the plate.

In testimony whereof I affix my signature.

EDMUND G. BARKER.

Witness:
JACK NANCE.